United States Patent
Basu et al.

(10) Patent No.: US 7,702,631 B1
(45) Date of Patent: Apr. 20, 2010

(54) METHOD AND SYSTEM TO PRODUCE AND TRAIN COMPOSITE SIMILARITY FUNCTIONS FOR PRODUCT NORMALIZATION

(75) Inventors: Sugato Basu, Redwood City, CA (US); Mikhail Bilenko, Austin, TX (US); Mehran Sahami, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 617 days.

(21) Appl. No.: 11/376,503

(22) Filed: Mar. 14, 2006

(51) Int. Cl.
G06F 17/30 (2006.01)
G06F 7/00 (2006.01)

(52) U.S. Cl. .............................. 707/6; 707/2; 707/104.1
(58) Field of Classification Search ........................ None
See application file for complete search history.

(56) References Cited

U.S. PATENT DOCUMENTS

| | | | | |
|---|---|---|---|---|
| 5,671,333 | A | 9/1997 | Catlett et al. | 395/20 |
| 5,835,902 | A | 11/1998 | Jannarone | 706/26 |
| 6,571,225 | B1 | 5/2003 | Oles et al. | 706/12 |
| 6,728,706 | B2 * | 4/2004 | Aggarwal et al. | 707/5 |
| 6,853,996 | B1 | 2/2005 | Chen et al. | 707/10 |
| 2003/0229604 | A1 | 12/2003 | Zaragoza et al. | 706/16 |
| 2004/0220987 | A1 | 11/2004 | Dunagan et al. | 708/446 |
| 2005/0289039 | A1 * | 12/2005 | Greak | 705/37 |

FOREIGN PATENT DOCUMENTS

EP     1006458 A1     6/2000

OTHER PUBLICATIONS

Ananthakrishna, R., et al., "Eliminating Fuzzy Duplicates in Data Warehouses," In Proceedings of the 28$^{th}$ Int'l Conf. on Very Large Databases (VLDB-2002), Hong Kong, China, 2002.
Bansal, N., et al., "Correlation Clustering," 43$^{rd}$ Annual Symposium on Foundations of Computer Science (FOCS), pp. 238-247, 2002.
Baxter, R., et al., "A Comparison of Fast Blocking Methods for Record Linkage," In Proceeding of the KDD-2003 Workshop on Data Cleaning, Record Linkage, and Object Consolidation, pp. 25-27, 2003.

(Continued)

*Primary Examiner*—Greta L Robinson
*Assistant Examiner*—James J Wilcox
(74) *Attorney, Agent, or Firm*—Morgan, Lewis & Bockius LLP

(57) ABSTRACT

A method and system to produce and train composite similarity functions for record linkage problems, including product normalization problems, is disclosed. In one embodiment, for a group of products in a plurality of products, a composite similarity function is constructed for the group of products from a weighted set of basis similarity functions. Training records are used to calculate the weights in the weighted set of basis similarity functions in the composite similarity function for the group of products. In another embodiment, a composite similarity function is applied to pairs of training records. The application of the composite similarity function provides a number that can be used to indicate whether two records relate to a common subject. The composite similarity function includes a weighted set of basis similarity functions. A perceptron algorithm is used to modify the weights in the weighted set.

16 Claims, 3 Drawing Sheets

OTHER PUBLICATIONS

Bhattacharya, I., et al., "Iterative Record Linkage for Cleaning and Integration," In Proceeding of the SIGMOD-2004 Workshop on Research Issues on Data Mining and Knowledge Discovery (DMKD-04), pp. 11-18, 2004.

Bilenko, M., et al., "On Evaluation and Training-Set Construction for Duplicate Detection," in Proceedings of the SIGKKD 2003 Workshop on Data Cleaning, Record Linkage, and Object Consolidation, pp. 7-12, 2003.

Bilenko, M., et al., "Adaptive Duplicate Detection Using Learnable String Similarity Measures," In Proceedings of the $9^{th}$ ACM-SIGKDD Int'l Conf. on Knowledge Discovery and Data Mining (KKD-2003), Washington DC, pp. 39-48, Aug. 2003.

Bilenko, M., "Learnable Similarity Functions and Their Application to Clustering and Record Linkage," Proceedings of the 9th AAAAI/SIGART Doctoral Consortium, San Jose, CA, pp. 981-982, Jul. 2004.

Carreras, X., et al., "Learning a Perceptron-Based Named Entity Chunker via Online Recognition Feedback," In Proceedings of CoNLL-2003, Edmonton, Canada, pp. 156-159, 2003.

Charikar, M., et al., "Clustering with Qualitative Information," In Proceedings of the $44^{th}$ Annual IEEE Symposium on Foundations of Computer Science, 2003.

Chaudhuri, S., et al., "Robust and Efficient Fuzzy Match for Online Data Cleaning," In Proceedings of ACM SIGMOD 2003, pp. 313-324, 2003.

Cohen, W.W., et al., "Hardening Soft Information Sources," In Proceedings of ACM SIGKDD 2000, pp. 255-259, 2000.

Cohen, W.W., et al., Learning to Match and Cluster Large High-Dimensional Data Sets for Data Integration, In Proceedings of ACM-SIGKDD 2002, pp. 475-480, 2002.

Collins, M., "Ranking Algorithms for Named-Entity Extraction: Boosting and the Voted Perception," In Proceedings of the Annual Meeting of the Association for Computational Linguistics (ACL-02), Philadelphia, PA, p. 489-496, 2002.

Collins, M., "Discriminative Training Methods for Hidden Markov Models: Theory and Experiments with Perceptron Algorithms," In Proceedings of EMNLP-2002, pp. 1-8, 2002.

Crammer, K., et al., "Kernel Design Using Boosting," In Proceedings of the $15^{th}$ Annual Conference on Neural Information Processing Systems, NIPS'01, 2002.

Cristianini, R., et al., "On Kernel Target Alignment," In Proceedings of the Neural Information Processing Systems, NIPS'01, pp. 367-373, 2002.

Cunningham, H., et al., "Human Language Technology for the Semantic Web," ESWS, Crete, Greece, May 2004.

Dekel, O., et al., "Large Margin Hierarchical Classification," In Proceedings of $21^{st}$ Int'l Conf. on Machine Learning (ICML-2004), Banff, Canada, 2004.

Dietterich, T.G., "Machine-Learning Research," American Assoc. for Artificial Intelligence, pp. 97-99, Winter 1997.

Doan, A., et al., "Object Matching for Information Integration: A Profiler-Based Approach," In Proceedings of the IJCAI-2003 Workshop on Information Integration on the Web, Acapulco, Mexico, pp. 53-58, Aug. 2003.

Doorenbos, R..B., et al., "A Scalable Comparison-Shopping Agent for the World-Wide Web," In Proceedings of Agents-1997, pp. 39-48, 1997.

Farahbod, R., "Modified Voted Perceptron: A Re-Ranking Method for NP-Chunking," Simon Fraser University, Dec. 2002.

Fellegi, I.P., et al., "A Theory for Record Linkage," J. of the American Statistical Assoc., vol. 64, No. 328, pp. 1183-1210, Dec. 1969.

Freund, Y., et al., "Large Margin Classification Using the Perceptron Algorithm," Machine Learning, vol. 37, pp. 277-296, 1999.

Hernandez, M.A., et al., "The Merge-Purge Problem for Large Databases," In Proceedings of ACM SIGMOS-1995, pp. 127-138, 1995.

Jain, A.K., et al., "Data Clustering: A Review," ACM Computing Surveys, vol. 31, No. 3, pp. 264-323, 1999.

Jaro, M., "Advances in Record-Linkage Methodology as Applied to Matching the 1985 Census of Tampa, Florida," J. of the American Statistical Assoc., vol. 84, pp. 414-420, 1989.

Kamvar, S.D., et al., "Interpreting and Extending Classical Agglomerative Clustering Algorithms Using a Model-Based Approach," In Proceedings of the $19^{th}$ Int'l Conf. on Machine Learning (ICML-2002), 2002.

Kashima, H., et al., "Kernel-Based Discriminative Learning Algorithms for Labeling Sequences, Trees, and Graphs," In Proceedings of the $21^{st}$ Int'l Conf. on Machine Learning, Banff, Canada, 2004.

Kivinen, J., et al. "Online Learning with Kernels," IEEE Transactions on Signal Processing, vol. 52, No. 8, pp. 2165-2176, 2002.

Koller, D., et al., "Hierarchically Classifying Documents Using Very Few Words," In Proceedings of the $14^{th}$ Intl Conf. on Machine Learning (ICML-97), pp. 170-178, 1997.

Lanckriet, G.R.G., et al., "Learning the Kernel Matrix with Semidefinite Programming," In Proceedings of the $19^{th}$ Int'l Conf. on Machine Learning, Sydney, Australia, 2002.

Lawrence, S., et al., "Autonomous Citation Matching," In Proceedings of Agents-1999, pp. 392-393, 1999.

Li, X., et al., "Robust Reading: Identification and Tracing of Ambiguous Names," In Proceedings of NAACL-2004, pp. 17-24, 2004.

Li, Y., "Selective Voting for Perceptron-Like Online Learning," In Proceedings of $19^{th}$ Int'l Conf. on Machine Learning, 2002.

McCallum, A., et al., "Improving Text Classification by Shrinkage in a Hierarchy of Classes," In Proceedings of the $15^{th}$ Int'l Conf. on Machine Learning (ICML-98), Madison, WI, pp. 359-367, 1998.

McCallum, A., et al., "Efficient Clustering of High-Dimensional Data Sets with Application to Reference Matching," In Proceedings of SCM SIGKDD-2000, pp. 169-178, 2000.

McCallum, A., et al., "Object Consolidation by Graph Partitioning with a Conditionally-Trained Distance Metric," KDD Workshop on Data Cleaning, Record Linkage and Object Consolidation, 2003.

McCallum, A., et al., "Conditionally Models of Identity Uncertainty with Application to Noun Coreference," NIPS 17, pp. 905-912, 2005.

Monge, A.E., et al., "An Efficient Domain-Independent Algorithm for Detecting Approximately Duplicate Database Records," In Proceedings of SIGMOD 1997 Workshop on Research Issues on Data Mining and Knowledge Discovery, pp. 23-29, 1997.

Muller, K.R., et al., "An Introduction to Kernel-Based Learning Algorithms," IEEE Transactions of Neural Networks, vol. 12, No. 2, Mar. 2001.

Newcombe, H.B., et al., Automatic Linkage of Vital Records, Science, vol. 130, pp. 954-959, 1959.

Ng, A., "CS229 Lecture Notes," Simon Fraser University, 2004.

Olsen, C.F., "Parallel Algorithm for Hierarchical Clustering," Parallel Computing, vol. 21, pp. 1313-1325, 1995.

Pasula, H., et al., "Identity Uncertainty and Citation Matching," In NIPS 15, pp. 1401-1408, 2003.

Rand, W.M., "Objective Criteria for the Evaluation of Clustering Methods," J. of the American Statistical Assoc., vol. 66, pp. 846-850, 1971.

Renders, J.M., "Kernel Methods in Natural Language Processing," Xerox Research Center Europe, ACL'04 Tutorial, 2004.

Sarawagi, S., et al., "Interactive Deduplication Using Active Learning," In Proceedings ACM SIGKDD-2002, pp. 269-278, 2002.

Shalev-Shwartz, S., et al., Online and Batch Learning of Pseudo-Metrics, In Proceedings of ICML-2004, pp. 743-750, 2004.

Signla, P., et al., "Object Identification with Attribute-Mediated Dependencies," In Proceedings of PKDD-2005, 2005.

Singla, P., et al., "Multi-Relational Record Linkage," In Proceedings of the SIGKDD 2004 Workshop on Multi-Relational Data Mining (MRDM-2004), pp. 31-48, Aug. 2004.

Strehl, A., et al., "Impact of Similarity Measures on Web-Page Clustering," In AAAI-2000 Workshop on Artificial Intelligence for Web Search, pp. 58-64, 2000.

Tejada, S., et al., "Learning Domain-Independent String Transformation Weights for High Accuracy Object Identification," In Proceedings of ACM SIGKDD-2002, pp. 350-359, 2002.

Verykios, V.S., et al., "A Bayesian Decision Model for Cost Optimal Record Matching," The VLDB Journal, vol. 12, No. 1, pp. 28-40, 2003.

Warmuth, M.K., et al., "Active Learning in the Drug Discovery Process," Advances in Neural Information Processing Systems 14, MIT Press, Cambridge, MA, 2002.

Winkler, W., "Using the EM Algorithm for Weight Computation in the Fellegi-Sunter Model of Record Linkage," American Statistical Assoc., Proceedings of the Section on Survey Research Methods, pp. 667-671, 1988.

Winkler, W., et al., "The State of Record Linkage and Current Research Problems," Technical Report, Statistical Research Division, U.S. Bureau of the Census, Washington, DC, 1999.

"Resources of Named Entity Identification," http://mtgroup.ict.ac.cn/~sunjian/Named%20Entity%20Identification.htm, Dec. 15, 2004.

* cited by examiner

METHOD AND SYSTEM TO PRODUCE AND TRAIN COMPOSITE SIMILARITY FUNCTIONS FOR PRODUCT NORMALIZATION

TECHNICAL FIELD

The disclosed embodiments relate generally to machine learning. More particularly, the disclosed embodiments relate to methods and systems to produce and train composite similarity functions for record linkage problems, including product normalization problems.

BACKGROUND

Record linkage is the problem of identifying when two (or more) references to an object are referring to the same entity (i.e., the references are "co-referent"). One example of record linkage is identifying whether two paper citations (which may be in different styles and formats) refer to the same actual paper. Addressing the record linkage problem is important in a number of domains where multiple users, organizations, or authors may describe the same item using varied textual descriptions.

Historically, one of the most studied problems in record linkage is determining whether two database records for a person are referring to the same real-life individual. In applications from direct marketing to survey response (e.g., the U.S. Census), record linkage is often seen as an important step in data cleaning in order to avoid waste and maintain consistent data.

More recently, record linkage has become an issue in several web applications. For example, the task of determining whether two paper citations refer to the same true publication is an important problem in online systems for scholarly paper searches, such as CiteSeer (http://citeseer.ist.psu.edu) and Google Scholar (http://scholar.google.com).

A new record linkage problem—called product normalization—arises in online comparison shopping. Here, two different websites may sell the same product, but provide different descriptions of that product to a comparison shopping database. (Note: Records containing product descriptions are also called "offers" herein.) Variations in the comparison shopping database records can occur for a variety of reasons, including spelling errors, typographical errors, abbreviations, or different but equivalent descriptions that are used to describe the same product. For example, in online comparison shopping, shopping bots like Froogle (http://froogle.google.com) and MySimon (http://www.mysimon.com) merge heterogeneous data from multiple merchant websites into one product database. This combined product database is then used to provide one common access point for the customer to compare product specifications, pricing, shipping, and other information. In such cases, two websites may have two different product offers that refer to the same underlying product, e.g., "Canon ZR 65 MC Camcorder" and "Canon ZR65 Digital MiniDV Camcorder."

Thus, a comparison shopping engine is faced with the record linkage problem of determining which such offers are referring to the same true underlying product. Solving this product normalization problem allows the shopping engine to display multiple offers for the same product to a user who is trying to determine from which vendor to purchase the product. Accurate product normalization is also important for data mining tasks, such as analysis of pricing trends.

In online comparison shopping, the number of vendors and the sheer number of products (with potentially very different characteristics) make it very difficult to manually craft a single function that can adequately determine if two arbitrary offers are for the same product. Moreover, for different categories of products, different similarity functions may be needed that capture the notion of equivalence for each category. Hence, a method and system that provide for efficient production and training of similarity functions between offers and/or between product categories is needed.

Furthermore, in many record linkage tasks, such as product normalization, the records to be linked actually contain multiple fields (e.g., product name, description, manufacturer, price, etc.). Such records may either come in a pre-structured form (e.g., XML or relational database records), or such fields may have been extracted from an underlying textual description. Hence, a method and system that provide for efficient production and training of similarity functions between offers with multiple fields is also needed.

Another consideration in record linkage problems like product normalization is the fact that new data is continuously becoming available. As a result, a learning approach to the linkage problem in such settings should be able to readily use new training data without having to retrain on previously seen data.

Thus, it would be highly desirable to develop methods and systems that efficiently produce and train composite similarity functions for record linkage problems, including product normalization problems.

SUMMARY

The present invention overcomes the problems described above.

One aspect of the invention is a computer-implemented method that involves, for a group of products in a plurality of products, constructing a composite similarity function for the group of products from a weighted set of basis similarity functions and using training records to calculate the weights in the weighted set of basis similarity functions in the composite similarity function for the group of products. A basis similarity function provides a numerical indication of the similarity of entries in corresponding fields in data records for products in the group of products.

Another aspect of the invention is a system comprising at least one computer. The at least one computer is configured to, for a group of products in a plurality of products, construct a composite similarity function for the group of products from a weighted set of basis similarity functions and use training records to calculate the weights in the weighted set of basis similarity functions in the composite similarity function for the group of products.

Another aspect of the invention involves a machine readable medium having stored thereon data representing sequences of instructions, which when executed by a computer, cause the computer to, for a group of products in a plurality of products, construct a composite similarity function for the group of products from a weighted set of basis similarity functions and use training records to calculate the weights in the weighted set of basis similarity functions in the composite similarity function for the group of products.

Another aspect of the invention involves a system that comprises, for a group of products in a plurality of products, means for constructing a composite similarity function for the group of products from a weighted set of basis similarity functions and means for using training records to calculate the weights in the weighted set of basis similarity functions in the composite similarity function for the group of products.

Another aspect of the invention is a computer-implemented method in which a composite similarity function is applied to pairs of training records. The application of the composite similarity function provides a number that can be used to indicate whether two records relate to a common subject. The composite similarity function includes a weighted set of basis similarity functions. A perceptron algorithm is used to modify the weights in the weighted set.

Another aspect of the invention is a system comprising at least one computer. The at least one computer is configured to apply a composite similarity function to pairs of training records. The application of the composite similarity function provides a number that can be used to indicate whether two records relate to a common subject. The composite similarity function includes a weighted set of basis similarity functions. The at least one computer is also configured to use a perceptron algorithm to modify the weights in the weighted set.

Another aspect of the invention involves a machine readable medium having stored thereon data representing sequences of instructions, which when executed by a computer, cause the computer to apply a composite similarity function to pairs of training records. The application of the composite similarity function provides a number that can be used to indicate whether two records relate to a common subject. The composite similarity function includes a weighted set of basis similarity functions. When executed by a computer, the instructions also cause the computer to use a perceptron algorithm to modify the weights in the weighted set.

Another aspect of the invention involves a system that comprises means for applying a composite similarity function to pairs of training records. The application of the composite similarity function provides a number that can be used to indicate whether two records relate to a common subject. The composite similarity function includes a weighted set of basis similarity functions. The system also comprises means for using a perceptron algorithm to modify the weights in the weighted set.

Thus, the invention efficiently produces and trains composite similarity functions for record linkage problems, including product normalization problems.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

DESCRIPTION OF EMBODIMENTS

Methods and systems are described that show how to produce and train composite similarity functions for record linkage problems, including product normalization problems. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

Figure 1:
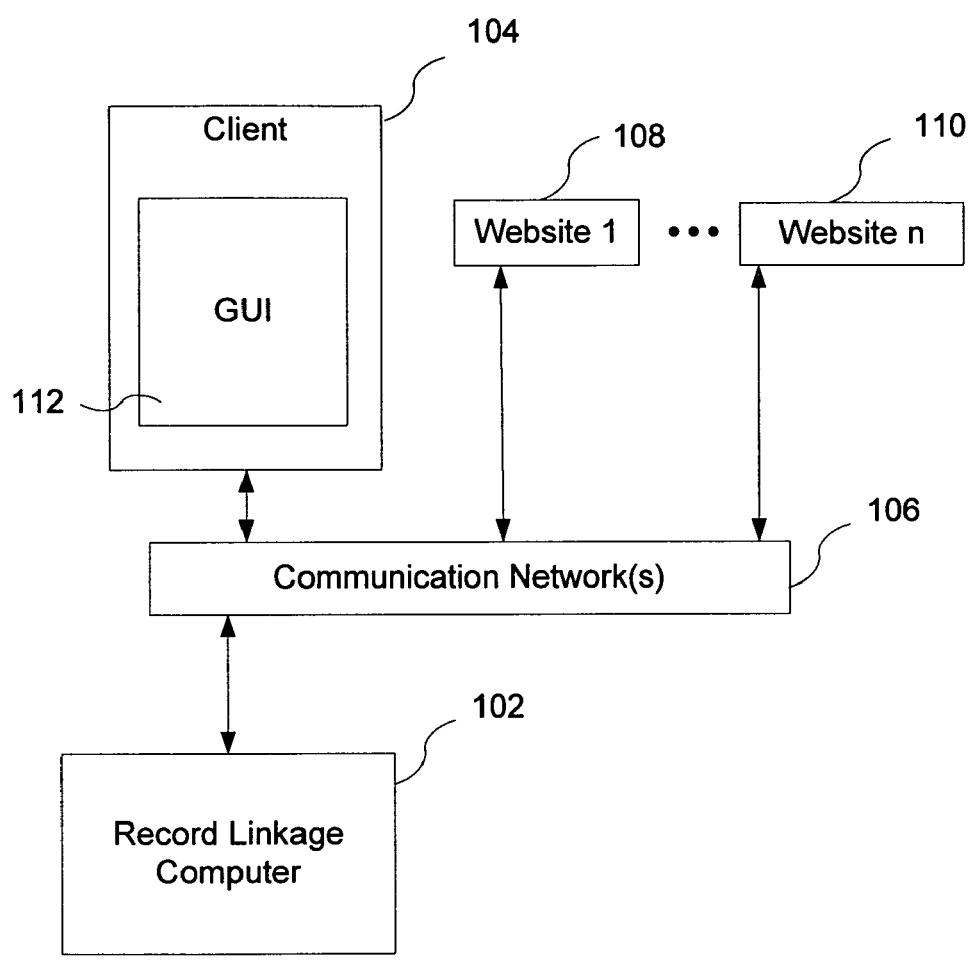
FIG. 1 is a block diagram illustrating an exemplary distributed computer system according to an embodiment of the invention.
Figure 2:
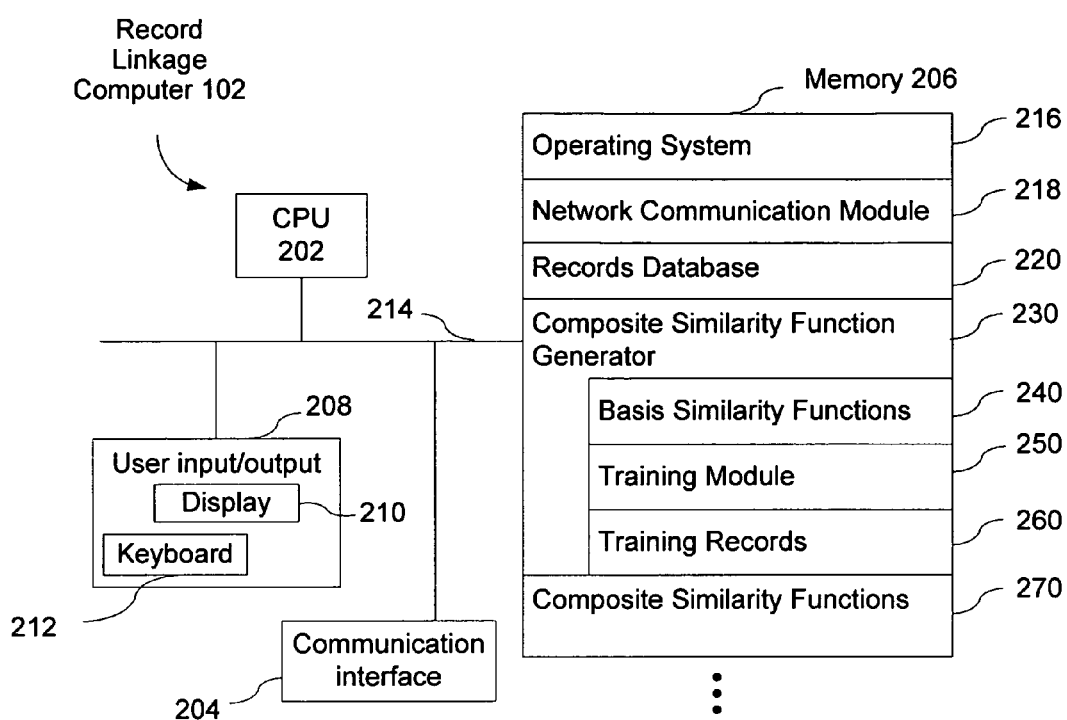
FIG. 2 is a block diagram illustrating record linkage computer 102 in accordance with one embodiment of the present invention.

FIG. 1 is a block diagram illustrating an exemplary distributed computer system according to an embodiment of the invention. This system includes record linkage computer 102, multiple websites such as websites 108 and 110, client computer 104, and communication network(s) 106 for interconnecting these components. Client 104 includes graphical user interface (GUI) 112. Referring to FIGS. 1 and 2, record linkage computer 102 collects records (e.g., web pages from multiple websites 108-110) and stores them in records database 220. In some embodiments, the records contain information for a plurality of products. In some embodiments, for a group of products in the plurality of products, composite similarity function generator 230 constructs a composite similarity function from a weighted set of basis similarity functions 240. In other words, composite similarity function generator 230 constructs a composite similarity function for a group of products in the plurality of products. In some embodiments, the group of products is a product category. In some embodiments, the group of products is coextensive with the plurality of products. Training module 250 uses training records 260 to calculate the weights in the weighted set of basis similarity functions in the composite similarity function for the group of products. The composite similarity functions 270 can then be used to identify records in database 220 that correspond to the same product. In some embodiments, some or all of the records that correspond to the same product are sent to client 104 for display in GUI 112.

FIG. 2 is a block diagram illustrating record linkage computer 102 in accordance with one embodiment of the present invention. Computer 102 typically includes one or more processing units (CPU's) 202, one or more network or other communications interfaces 204, memory 206, and one or more communication buses 214 for interconnecting these components. Computer 102 optionally may include a user interface 208 comprising a display device 210 and a keyboard 212. Memory 206 may include high speed random access memory and may also include non-volatile memory, such as one or more magnetic disk storage devices. Memory 206 may optionally include one or more storage devices remotely located from the CPU(s) 202. In some embodiments, the memory 206 stores the following programs, modules and data structures, or a subset or superset thereof:

an operating system 216 that includes procedures for handling various basic system services and for performing hardware dependent tasks;

a network communication module 218 that is used for connecting computer 102 to other computers (e.g., websites 108-110) via one or more communication network interfaces 204 (wired or wireless), and one or more communication networks, such as the Internet, other wide area networks, local area networks, metropolitan area networks, and so on;

a records database 220 that receives and stores records (e.g., from websites 108-110);

a composite similarity function generator 230 that produces composite similarity functions 270 from a weighted set of basis similarity functions, which includes:

basis similarity functions 240 that indicate whether the data in corresponding fields in two records relate to a common subject (e.g., a product) and are used to construct composite similarity functions; and training module 250 that uses training records 260 to calculate and/or modify the weights in the weighted set of basis similarity functions for a given composite similarity function; and composite similarity functions 270 that are created by function generator 230 and used to identify co-referent records in records database 220.

Each of the above identified modules and applications correspond to a set of instructions for performing a function described above. These modules (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Although FIG. 2 shows record linkage computer 102 as a number of discrete items, FIG. 2 is intended more as a functional description of the various features which may be present in computer 102 rather than as a structural schematic of the embodiments described herein. In practice, and as recognized by those of ordinary skill in the art, items shown separately could be combined and some items could be separated. For example, some items shown separately in FIG. 2 could be implemented on single computers and single items could be implemented by one or more computers. The actual number of computers in computer 102 and how features are allocated among them will vary from one implementation to another, and may depend in part on the amount of data traffic that the system must handle during peak usage periods as well as during average usage periods.

Producing Composite Similarity Functions

In record linkage, a function is created that is used to determine the degree of similarity between records. For example, any binary classifier that produces confidence scores can be used to estimate the overall similarity of a record pair $(R_{i1}, R_{i2})$ by classifying the corresponding feature vector $x_i$ and treating classification confidence as similarity.

Records in a product database generally have multiple attributes of different types, each of which has an associated similarity measure. For instance, string similarity measures like edit distance or cosine similarity can be used to compare textual attributes like product name and description. Numerical functions (e.g., relative difference) can be used for real-valued attributes like price. Customized similarity functions can be used for categorical attributes, e.g., tree proximity can be used as a similarity measure for a categorical attribute that corresponds to the location of an item in the product category hierarchy. (See the discussion of Offers A and B below for more details.)

An adaptive framework for learning similarity functions is beneficial because it lets a product normalization algorithm be domain-independent. Consider the following example. When performing record linkage for product normalization, equivalence of book titles and author names is generally highly indicative of co-referent book records. So, the weight of the string similarity measure corresponding to the product name attribute should be high for the book domain. On the other hand, product name similarity is often insufficient by itself to link records corresponding to offers for electronic products. For example, "Toshiba Satellite M35X-S309 notebook" and "Toshiba Satellite M35X-S309 notebook battery" have a high textual similarity but refer to different products. At the same time, for high-end electronic items, price similarity is an important indicator of offer equivalence—the notebook and the battery records have very different prices, indicating that they are not co-referent. Compared to the weights in the book domain, the weight of the basis similarity function corresponding to product name in this example should be lower and the weight of the basis function measuring price similarity should be higher. Thus, an adaptive framework that can learn a composite similarity function, customized for a particular group of products (e.g., a product category), from training data is useful for a general purpose product normalization algorithm.

Basis Functions

In some embodiments, a set of K basis functions $f_1(R_1, R_2), f_2(R_1, R_2), \ldots, f_K(R_1, R_2)$ are defined, which are basis similarity functions 240 between data in corresponding fields in two records $R_1$ and $R_2$. While some similarity functions may only take into account the data in individual fields of the records, other similarity functions may take into account data in multiple fields of the records. The methods disclosed herein do not require that the basis functions 240 only operate on single fields of records. Indeed, the methods presented here are general enough to make use of arbitrarily complex functions of two records, e.g., concatenations of multiple attributes. However, for clarity and easier applicability to real-world tasks, basis similarity functions of single fields are described here. In some embodiments, a composite similarity function, denoted f*, is produced from a linear combination (with corresponding weights $\alpha_i$ and an additional threshold parameter $\alpha_0$) of the basis functions:

$$f^*(R_1, R_2) = \alpha_o + \sum_{i=1}^{K} \alpha_i f_i(R_1, R_2)$$

Values provided by f* are not constrained to be positive: the learning method described below assumes that the threshold ac may take on a negative value so that for pairs of records that are not equivalent f* can return a negative value.

In some embodiments, once trained, f* can be used to produce a similarity matrix S over all pairs of records. In turn, S can be used with a similarity based clustering algorithm to determine clusters, each of which contains a set of records that presumably should be linked. Each cluster can be interpreted as a set of records referring to the same true underlying item.

Pair Space Representation

Identifying co-referent records requires classifying every candidate pair of records as belonging to the class of matches M or to the class of nonmatches U. Given some domain ΔR from which each record is sampled, and K basis similarity functions $f_k: \Delta_R \times \Delta_R \rightarrow R$ that operate on pairs of records, a pair-space vector $x_i \in R^{K+1}$ can be produced for every pair of records $(R_{i1}, R_{i2})$ as $$x_i = [1, f_1(R_{i1}, R_{i2}), \ldots, f_K(R_{i1}, R_{i2})]^T$$

where the K values obtained from basis similarity functions are concatenated with a default attribute that always has value 1, which corresponds to the threshold parameter $\alpha_0$. The exponent T here is shorthand for 'matrix transpose', which makes $x_i$ a column vector (k-by-1 matrix), as opposed to a row vector (1-by-k matrix)].

Figure 3:
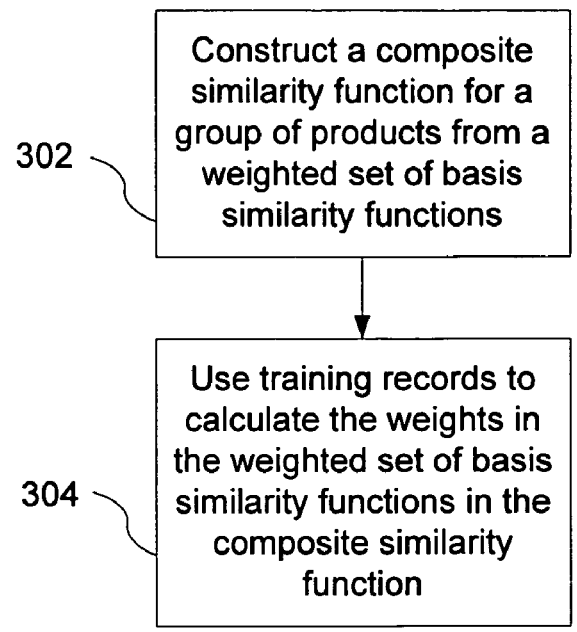
FIG. 3 is a flowchart representing a computer-implemented method of producing a composite similarity function for product normalization according to one embodiment of the present invention.

FIG. 3 is a flowchart representing a computer-implemented method of producing a composite similarity function for product normalization according to one embodiment of the present invention. The process shown in FIG. 3 is performed by record linkage computer 102 (FIG. 1). It will be appreciated by those of ordinary skill in the art that one or more of the acts described may be performed by hardware, software, or a combination thereof, as may be embodied in one or more computing systems.

For a group of products in a plurality of products, a composite similarity function is constructed from a weighted set of basis similarity functions (e.g., by function generator 230) (302). As explained above and illustrated by example below, a basis similarity function 240 provides a numerical indication of the similarity of entries in corresponding fields in two data records for products in the group of products. In some embodiments, the composite similarity function is a transform of a weighted linear combination of basis similarity functions, such as a sigmoid function. In some embodiments, the basis similarity functions are kernel functions, which are well known in pattern analysis (e.g., see J. Shawe-Taylor and N. Cristianini, "Kernel Methods for Pattern Analysis", Cambridge University Press, 2004).

For example, consider the following two offers with four attributes each:

Offer A:

$attr_1$, Product Name: Canon EOS 20D Digital SLR Body Kit (Req. Lens) USA $attr_2$, Product Price: $1499.00

$attr_3$, Product Description: Canon EOS 20d digital camera body (lens not included), BP511a battery, CG580 battery charger, USB cable, Video cable, instructions, warranty, 3 CDROM software discs, Wide strap.

$attr_4$, Classified Category: 474 (Electronics->Cameras->Digital Cameras)

Offer B:

$attr_1$, Product Name: Canon EOS 20d Digital Camera Body USA—Lens sold separately $attr_2$, Product Price: $1313.75

$attr_3$, Product Description: Canon EOS 20D is a digital, single-lens reflex, AF/AE camera with built-in flash, providing 8.2 megapixel resolution and up to 23 consecutive frames at 5 fps.

$attr_4$, Classified Category: 474 (Electronics->Cameras->Digital Cameras)

The attributes are of different types: $attr_1$ and $attr_3$ are textual (strings); $attr_2$ is numeric; and $attr_4$ is categorical. In the above example, the value "474" in $attr_4$ is just an identifier, whose value corresponds to a specific category in a product hierarchy tree.

For product offers with these attributes, three types of basis functions 240 may be used—$f_{cos}$, $f_{num}$, and $f_{cat}$—each of which operates on attribute values of a particular type:

1. $f_{cos}$ ($str_1$, $str_2$): cosine similarity between string values $str_1$ and $str_2$:

$f_{cos}$($str_1$, $str_2$)=cos (TFIDF ($str_1$), TFIDF ($str_2$)) where TFIDF ($str_1$) and TFIDF ($str_2$) are Term Frequency—Inverse Document Frequency representations of $str_1$ and $str_2$ as numerical vectors, $v_1$ and $v_2$. These vectors have dimensionality equal to the total number of tokens ("words") seen in the entire records database 220; but only those components that correspond to tokens present in a particular string are non-zero. For example, if the entire vocabulary has 20,000 different tokens, a string "Canon EOS" is represented by a 20,000-dimensional vector that has only two non-zero components, those corresponding to 'Canon' and to 'EOS' tokens. The cosine similarity of two vectors is defined as the dot product of the vectors divided by the product of the magnitudes of the two vectors, $$\frac{v_1 \cdot v_2}{|v1||v2|}.$$

2. $f_{num}$ ($n_1$, $n_2$): 1—relative difference between numeric values $n_1$ and $n_2$:

$f_{num}$ ($n_1$, $n_2$)=1-$|n_1-n_2|/((n_1+n_2)/2)$

3. $f_{cat}$ ($cat_1$, $cat_2$): similarity between categorical values computed as the inverse of the hierarchy distance between categories:

$f_{cat}$ ($cat_1$, $cat_2$)=1/(1+Dist ($cat_1$, $cat_2$))

where Dist ($cat_1$, $cat_2$) is the distance between $cat_1$ and $cat_2$ in the category hierarchy—in other words, the number of categories between them in the tree.

Note that one of ordinary skill in the art would recognize that other types of basis functions could be used beyond the three illustrated here. For example, other token-based or sequence-based string similarity functions, such as the string edit distance, could also be used to determine the similarity of product names and/or product descriptions.

If these three basis functions 240 are used on four-attribute product descriptions for offers A and B, a 4-dimensional vector of similarity values, [$v_1$ $v_2$ $v_3$ $v_4$], is produced, where $v_1$=$f_{cos}$(A.$attr_1$, B.$attr_1$)<-string similarity between titles $v_2$=$f_{num}$(A.$attr_2$, B.$attr_2$)<-numeric similarity between prices $v_3$=$f_{cos}$(A.$attr_3$, B.$attr_3$)<-string similarity between descriptions $v_4$=$f_{cat}$(A.$attr_4$, B.$attr_4$)<-similarity between the categories of products The actual similarity values computed by the basis functions 240 for offers A and B shown above are approximately the following: $v_1$=0.7; $v_2$=0.87; $v_3$=0.08; and $v_4$=1.0.

Now, assume that the following weights corresponding to basis similarity functions 240 for particular attributes have been learned:

$w_1$=0.3<-weight for $f_{cos}$(A.$attr_1$, B.$attr_1$), title similarity;

$w_2$=0.35<-weight for $f_{num}$(A.$attr_2$, B.$attr_2$), price similarity;

$w_3$=0.1<-weight for $f_{cos}$(A.$attr_3$, B.$attr_3$), description similarity; and $w_4=0.25$ <-weight for $f_{cat}(A.attr_4, B.attr_4)$, category similarity.

Applying these weights to the vector of basis function similarities, the overall similarity score—Sim (A, B)—for product offers A and B is obtained:

$$\text{Sim}(A, B) = (w_1 * v_1) + (w_2 * v_2) + (w_3 * v_3) + (w_4 * v_4) =$$

$$(0.3*0.7) + (0.35*0.87) + (0.1*0.08) + (0.25*1.0) = 0.77$$

If the composite similarity function is the similarity score transformed by the sigmoid function, the following final score is obtained:

$$\text{SimTransformed}(A, B) = 1/(1 + \exp(-\text{Sim}(A, B))) = 1/(1 + \exp(-0.77)) = 0.68$$

where the composite similarity function, f* is:

$$f^* = 1/(1 + \exp(-\{(w_1 * f_{cos}(A.attr_1, B.attr_1)) + (w_2 * f_{num}(A.attr_2, B.attr_2)) + (w_3 * f_{cos(A.attr3)}, B.attr_3))$$

$$+ (w_4 * f_{cat}(A.attr_4, B.attr_4))\})$$

As described below, training records are used to calculate the weights in the weighted set of basis similarity functions in the composite similarity function (e.g., by training module 250) (304). In some embodiments, the averaged perceptron algorithm is used to calculate the weights.

Training a Composite Similarity Function for Record Linkage

As noted above, any binary classifier that produces confidence scores can be used to estimate the overall similarity of a record pair $(R_{i1}, R_{i2})$ by classifying the corresponding feature vector $x_i$ and treating classification confidence as similarity. The classifier is typically trained using a corpus of labeled data in the form of pairs of records that are known to be either co-referent $((R_{i1}, R_{i2}) \in M)$ or non-equivalent $((R_{i1}, R_{i2}) \in U)$. Potential classifiers include, without limitation, the averaged perceptron, Naïve Bayes, decision trees, maximum entropy, and Support Vector Machines.

Figure 4:
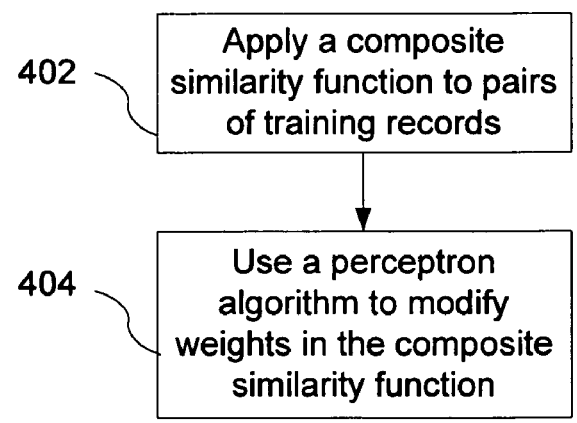
FIG. 4 is a flowchart representing a computer-implemented method of training a composite similarity function for record linkage according to one embodiment of the present invention.

FIG. 4 is a flowchart representing a computer-implemented method of training a composite similarity function for record linkage according to one embodiment of the present invention. The process shown in FIG. 4 may be performed by record linkage computer 102 (FIG. 1). It will be appreciated by those of ordinary skill in the art that one or more of the acts described may be performed by hardware, software, or a combination thereof, as may be embodied in one or more computing systems.

A composite similarity function is applied to pairs of training records (e.g., by training module 250) (402). The application of the composite similarity function provides a number that can be used to indicate whether two records relate to a common subject. In some embodiments, the common subject is a product. In other embodiments, the common subject is, without limitation: a seller; a person; a category, class, or other group of products; or a reference.

The composite similarity function includes a weighted set of basis similarity functions. In some embodiments, the composite similarity function is a transform of a weighted linear combination of basis similarity functions. In some embodiments, the basis similarity functions are kernel functions.

In some embodiments, a perceptron algorithm is used to modify the weights in the weighted set (e.g., by training module 250) (404). In some embodiments, the weights of each basis function in a linear combination are learned from labeled training data using a version of the voted perceptron algorithm, which is very efficient in an online learning setting for large volumes of streaming data. This algorithm can also be deployed in batch-mode learning using standard online-to-batch conversion techniques, and it has comparable empirical performance to state-of-the-art learning techniques such as boosting. In some embodiments, the perceptron algorithm is the averaged perceptron. In some embodiments, the perceptron algorithm is the voted perceptron.

The averaged perceptron algorithm, described in Table 1, is a space-efficient variation of the voted perceptron algorithm proposed and analyzed by Freund and Schapire. The averaged perceptron is a linear classifier that, when given an instance $x_i$, generates a prediction of the form $\hat{y}_i = \alpha_{avg} \cdot x_i$, where $\alpha_{avg}$ is a vector of (K+1) real weights that is averaged over all weight vectors observed during the training process (as opposed to just using the final weight vector in the regular perceptron algorithm). Each of the weights corresponds to the importance of the corresponding basis similarity function. $\alpha_{avg0}$ is the classification threshold separating the classes of co-referent and non-equivalent records. $x_i$ is the pair-space vector defined above. The label −1 is assigned to the class U of non-equivalent record pairs, and the label +1 is assigned to the class M of co-referent record pairs.

The averaged perceptron algorithm has several properties that make it particularly useful for large-scale streaming linkage tasks. First and foremost, it is an online learning algorithm: the similarity function parameters (weights) that it generates can be easily updated as more labeled examples become available without the need to retrain on all previously seen training data. Second, the averaged perceptron is a linear model that produces a hypothesis that is intuitive and easily interpretable by humans, which is an attractive property for a system to be deployed and maintained on a continuous real-world task. Third, the averaged perceptron is a discriminative classifier with strong theoretical performance guarantees.

---

Input: Training set of record pairs $\{(R_{i1}, R_{i2}, y_i)\}$, $y \in \{-1, +1\}$,
    number of epochs T,
        similarity functions $F = \{f_i(.,.)\}_{i=1 \text{ to } K}$
Output: Weight vector $\alpha avg = \{\alpha_i\}_{i=0 \text{ to } K}$
Algorithm:
Initialize $\alpha_{avg} = \alpha = 0$
Initialize $x_i = [1, f_1(R_{i1}, R_{i2}), \ldots, f_K(R_{i1}, R_{i2})]$ for $i = 1 \ldots M$
    For $t = 1 \ldots T$ {
        For $i = 1 \ldots M$ {
            Compute $\hat{y}_i = \text{sign}(\alpha \cdot x_i)$.
            If $\hat{y}_i \neq y_i$ {
                $\alpha = \alpha + y_i x_i$
            }
        $\alpha_{avg} = \alpha_{avg} + \alpha$
        }
}
$\alpha_{avg} = \alpha_{avg} / (T \cdot M)$

---

Table 1 shows the averaged perceptron training algorithm for learning the parameters (weights) $\alpha_{avg}$. Freund and Schapire have proved several theoretical properties of the algorithm, including the fact that the expected number of mistakes made by a classifier trained using the algorithm does not depend on the weight vector dimensionality. This is a useful feature of the algorithm because the freedom to vary the number of basis similarity functions and to extend them at will is highly desirable in many applications. Having theoretical guarantees that such additions will not harm performance allows for experimentation with different basis functions 240 without the fear that bad local optima will arise due to correlations between attributes.

The algorithm can also be viewed as minimizing the cumulative hinge loss suffered on a stream of examples. As every training record pair $(R_{i1}, R_{i2}, y_i)$ with a corresponding feature vector $x_i$ is presented to the learner, it incurs a (hinge) loss $L(x_i, y_i)=\max\{-y_i\alpha_i\cdot x_i, 0\}$, and the vector of weights a is updated in the direction of the gradient to reduce the loss: $\alpha=\alpha-\delta L(x_i, y_i)/\delta\alpha$. Intuitively, this training procedure corresponds to iterative evaluation of the prediction for every training pair, and if the prediction differs from the true label, the weights are adjusted to correct for the error. This view can lead to variations of the algorithm using other loss functions, e.g., log-loss $L_{log}(x_i, y_i)=\ln(1+\exp(-y_i\,\alpha\cdot x_i))$.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for training a composite similarity function to identify when two records refer to a common underlying subject, comprising:
    at a computer comprising memory and one or more processors:
        applying the composite similarity function $f^*(R_1,R_2)$ to pairs of training records,
        wherein application of the composite similarity function $f^*(R_1,R_2)$ provides a number that can be used to indicate whether two records relate to a common underlying subject, and
        wherein the composite similarity function $f^*(R_1,R_2)$ is a transform of a weighted linear combination of basis similarity functions:

$$f^*(R_1, R_2) = f_{transform}\left[\sum_{i=1}^{K} \alpha_i f_i(R_1, R_2)\right]$$

wherein
    $f^*(R_1,R_2)$ is the composite similarity function, wherein the composite similarity function is configured to provide a composite similarity number that is used to indicate whether two records relate to the common underlying subject, and wherein the composite similarity number is adapted to facilitate identification and display of records for the common underlying subject, which is selected from the group consisting of a product a seller, a person and a reference,
    $R_1$ and $R_2$ are two records,
    $f_{transform}[\ ]$ is a transform function,
    $f_i(R_1,R_2)$ are respective basis similarity functions, and
    $\alpha_i$ are respective weights for respective basis similarity functions; and
using an averaged perceptron algorithm to modify the respective weights $\alpha_i$ in the weighted linear combination $$\sum_{i=1}^{K}\alpha_i f_i(R_1, R_2).$$

2. A computer-implemented method for training a composite similarity function to identify when two records refer to a common underlying subject, comprising:
    at a computer comprising memory and one or more processors:
        applying the composite similarity function $f^*(R_1,R_2)$ to pairs of training records, $$f^*(R_1,R_2)=f[f_1(R_1, R_2),\ldots,f_K(R_1,R_2), \alpha_1,\ldots,\alpha_K]$$

wherein
            $f^*(R_1,R_2)$ is the composite similarity function,
            $R_1$ and $R_2$ are two records,
            $f[\ ]$ is a function,
            $f_i(R_1,R_2)$ are respective basis similarity functions, and
            $\alpha_i$ are respective weights for respective basis similarity functions,
            wherein the composite similarity function $f^*(R_1,R_2)$ is configured to provide a composite similarity number that is used to indicate whether two records relate to the common underlying subject,
            wherein the composite similarity number is adapted to facilitate identification and display of records for the common underlying subject, the common underlying subject selected from the group consisting of a product, a seller, a person, and a reference, and
            wherein the composite similarity function $f^*(R_1,R_2)$ includes a weighted set of basis similarity functions; and
        using a perceptron algorithm to modify the respective weights $\alpha_i$ in the weighted set.

3. The method of claim 2, wherein the composite similarity function $f^*(R_1,R_2)$ is a transform of a weighted linear combination of basis similarity functions:

$$f^*(R_1, R_2) = f_{transform}\left[\sum_{i=1}^{K} \alpha_i f_i(R_1, R_2)\right]$$

wherein
    $f_{transform}[\ ]$ function, and $$\sum_{i=1}^{K}\alpha_i f_i(R_1, R_2)$$

is the weighted linear combination of basis similarity functions.

4. The method of claim 2, wherein the basis similarity functions $f_i(R_1,R_2)$ are kernel functions.

5. The method of claim 2, wherein the perceptron algorithm is an averaged perceptron.

6. The method of claim 2, wherein the perceptron algorithm is a voted perceptron.

7. A system for training a composite similarity function to identify when two records refer to a common underlying subject, comprising at least one computer, wherein said at least one computer is configured to:
    apply the composite similarity function $f^*(R_1,R_2)$ to pairs of training records, $$f^*(R_1,R_2)=f[f_1(R_1,R_2),\ldots,f_K(R_1,R_2), \alpha_1,\ldots,\alpha_K]$$

wherein
- $f^*(R_1,R_2)$ is the composite similarity function,
- $R_1$ and $R_2$ are two records,
- $f[\ ]$ is a function,
- $f_i(R_1,R_2)$ are respective basis similarity functions, and
- $\alpha_i$ are respective weights for respective basis similarity functions, wherein application of the composite similarity function $f^*(R_1,R_2)$ provides a composite similarity number that is used to indicate whether two records relate to the common underlying subject, wherein the composite similarity number is adapted to facilitate identification and display of records for the common underlying subject, the common underlying subject selected from the group consisting of a product, a seller, a person, and a reference, and wherein the composite similarity function $f^*(R_1,R_2)$ includes a weighted set of basis similarity functions; and use a perceptron algorithm to modify the respective weights $\alpha_i$ in the weighted set.

8. A machine readable medium having stored thereon data representing sequences of instructions for training a composite similarity function to identify when two records refer to a common underlying subject, which when executed by a computer, cause the computer to:

apply the composite similarity function $f^*(R_1,R_2)$ to pairs of training records, $$f^*(R_1,R_2)=f[f_1(R_1,R_2),\ldots,f_K(R_1,R_2),\alpha_1,\ldots,\alpha_K]$$

wherein
- $f^*(R_1,R_2)$ is the composite similarity function,
- $R_1$ and $R_2$ are two records,
- $f[\ ]$ is a function,
- $f_i(R_1,R_2)$ are respective basis similarity functions, and
- $\alpha_i$ are respective weights for respective basis similarity functions, wherein application of the composite similarity function $f^*(R_1,R_2)$ is configured to provide a composite similarity number that can be used to indicate whether two records relate to the common underlying subject, wherein the composite similarity number is adapted to facilitate identification and display of records for the common underlying subject, the common underlying subject selected from the group consisting of a product, a seller, a person, and a reference, and wherein the composite similarity function $f^*(R_1,R_2)$ includes a weighted set of basis similarity functions; and use a perceptron algorithm to modify the respective weights $\alpha_i$ in the weighted set.

9. A system for training a composite similarity function to identify when two records refer to a common underlying subject, comprising:

one or more processors;

memory;

means for applying the composite similarity function $f^*(R_1,R_2)$ to pairs of training records, $$f^*(R_1,R_2)=f[f_1(R_1,R_2),\ldots,f_K(R_1,R_2),\alpha_1,\ldots\alpha_K]$$

wherein
- $f^*(R_1,R_2)$ is the composite similarity function,
- $R_1$ and $R_2$ are two records,
- $f[\ ]$ is a function,
- $f_i(R_1,R_2)$ are respective basis similarity functions, and
- $\alpha_i$ are respective weights for respective basis similarity functions, wherein application of the composite similarity function $f^*(R_1,R_2)$ provides a composite similarity number that is used to indicate whether two records relate to the common underlying subject, wherein the composite similarity number is adapted to facilitate identification and display of records for the common underlying subject, the common underlying subject selected from the group consisting of a product, a seller, a person, and a reference, and wherein the composite similarity function $f^*(R_1,R_2)$ includes a weighted set of basis similarity functions; and means for using a perceptron algorithm to modify the respective weights $\alpha_i$ in the weighted set.

10. A computer-implemented method for producing a composite similarity function configured to identify when two records refer to a common underlying subject, comprising:

at a computer comprising memory and one or more processors:

for a group of subjects in a plurality of subjects, constructing the composite similarity function $f^*(R_1,R_2)$ for the group of subjects from a weighted set of basis similarity functions, $$f^*(R_1,R_2)=f[f_1(R_1,R_2),\ldots,f_K(R_1,R_2),\alpha_i,\ldots,\alpha_K]$$

wherein
- $f^*(R_1,R_2)$ is the composite similarity function, wherein the composite similarity function is configured to provide a composite similarity number that is used to indicate whether two records relate to the common underlying subject, which is selected from the group consisting of a product, a seller, a person, and a reference, and wherein the composite similarity number is adapted to facilitate identification and display of records for the common underlying subject,
- $R_1$ and $R_2$ are two records,
- $f[\ ]$ is a function,
- $f_i(R_1,R_2)$ are respective basis similarity functions, and
- $\alpha_i$ are respective weights for respective basis similarity functions, wherein a basis similarity function $f_i(R_1,R_2)$ is configured to provide a numerical indication of the similarity of entries in corresponding fields in data records for products in the group of subjects; and using training records to calculate the respective weights $\alpha_i$ in the weighted set of basis similarity functions in the composite similarity function $f^*(R_1,R_2)$ for the group of subjects.

11. The method of claim 10, wherein the composite similarity function $f^*(R_1,R_2)$ is a transform of a weighted linear combination of basis similarity functions:

$$f^*(R_1,R_2) = f_{transform}\left[\sum_{i=1}^{K} \alpha_i f_i(R_1,R_2)\right]$$

wherein $f_{transform}[\ ]$ is a transform function, and $$\sum_{i=1}^{K} \alpha_i f_i(R_1, R_2)$$

is the weighted linear combination of basis similarity functions.

12. The method of claim 10, wherein the basis similarity functions $f_i(R_1,R_2)$ are kernel functions.

13. The method of claim 10, including using an averaged perceptron algorithm to calculate the weights.

14. The method of claim 10, wherein the group of subjects is a product category.

15. The method of claim 10, wherein the group of subjects is coextensive with the plurality of subjects.

16. A system for producing a composite similarity function to identify when two records refer to a common underlying subject, comprising at least one computer, wherein said at least one computer is configured to:

for a group of subjects in a plurality of subjects, construct the composite similarity function $f^*(R_1,R_2)$ for the group of subjects from a weighted set of basis similarity functions, $f^*(R_1,R_2)=f[f_1(R_1,R_2),\ldots,f_K(R_1,R_2),\alpha_1,\ldots,\alpha_K]$ wherein $f^*(R_1,R_2)$ is the composite similarity function, wherein the composite similarity function is configured to provide a composite similarity number that is used to indicate whether two records relate to the common underlying subject, and wherein the composite similarity number is adapted to facilitate identification and display of records for the common underlying subject, which is selected from the group consisting of a product, a seller, a person, and a reference, $R_1$ and $R_2$ are two records, $f[\ ]$ is a function, $f_i(R_1,R_2)$ are respective basis similarity functions, and $\alpha_i$ are respective weights for respective basis similarity functions, wherein a basis similarity function $f_i(R_1,R_2)$ is configured to provide a numerical indication of the similarity of entries in corresponding fields in data records for subjects in the group of subjects; and use training records to calculate the respective weights $\alpha_i$ in the weighted set of basis similarity functions in the composite similarity function $f^*(R_1,R_2)$ for the group of subjects.

* * * * *